Patented Feb. 29, 1944

2,343,186

UNITED STATES PATENT OFFICE 2,343,186

FIREPROOFING PLASTICIZERS

Harry Hopkinson, Watertown, Mass.

No Drawing. Application August 12, 1940,
Serial No. 352,279

13 Claims. (Cl. 106—15)

This invention relates to plasticizers of the substantially water insoluble type which are compatible with cellulose ethers and esters, chlorinated rubber or the like and are commonly used to plasticize films or masses of such materials. Its purpose is to provide a novel composition consisting of a solution in such a plasticizer of one or more fireproofing salts which, when exposed to flame, fuse to form a fireproof coating about the substance exposed to the flame, or emit flame-smothering gases or both. By fireproof is meant to render incapable of supporting a flame after the source is removed.

My novel composition therefor presents active ingredients which fireproof any films or masses plasticized by it. Furthermore, the salts, being in solution in the plasticizer, become intimately and uniformly dispersed through any materials such as fabrics, wallboards, paper, etc. treated with a bath containing my composition to impregnate such materials rather than to be strained out by them as would be the case if the salt impregnation and dispersion even under in the bath and my composition thereby effectively fireproofs such materials as well.

By my invention I have effected such uniform salts impregnation and dispersion even under treatments where volatile solvents cannot be employed, such as in the molten compounding of thermoplastic materials, and I thereby effectively fireproof such thermoplastic materials.

The fireproofness imparted by my composition, furthermore, is permanent over long periods of exposure to atmospheric moisture and I have attained this result despite the water solubility of the fireproofing salts which I preferably employ by insuring a precipitate-forming reaction of the salts, to be described, rather than a leaching out when contracted by water.

As a specific example of a plasticizing composition and method of making it in accordance with my invention, the following ingredients, in parts by weight, may be employed:

| | Parts |
|---|---|
| Zinc chloride | 22 |
| Ethylene glycol monoethyl ether | 59 |
| Diethylene glycol monoethyl ether | 29 |
| Borax | 10 |
| Tricresyl phosphate | 120 |

The zinc chloride is dissolved in the ethylene glycol monoethyl ether. The diethylene glycol monoethyl ether is added with stirring after which the borax and tricresyl phosphate are added, and stirred until the mix becomes a clear liquid.

This liquid is then distilled at about 220° F. under reduced pressure to remove the volatile solvents (in this case the two alcohol ethers) which are collected as the distillate and are available to repeat the process.

The residue is a plasticizing composition embodying my invention. It is a clear liquid which my experiments indicate constitutes a solution of zinc chloride and borax in tricresyl phosphate.

As an example of a use of my composition, I have found the following treatment effective for fireproofing canvas: Dissolve 30 parts chlorinated rubber (20 C. P.) in 30 parts toluol and 30 parts ethylene glycol monoethyl ether. Add 40 parts of my composition made as above. Immerse the canvas in the bath thus prepared until saturated. Remove surface excess and dry.

The canvas treated as above is fireproof and has the flexibility desired for use as an awning, tarpaulin or the like. The fireproofing salts saturate and impregnate the fibers and have not been strained out and deposited on the surfaces of the fibers as would be the case if the salts were in suspension rather than in solution in the bath.

The fireproofness of the canves so treated is permanent over long periods of exposure to atmospheric moisture, although zinc chloride and borax are both soluble in water. To the extent to which water reaches and dissolves the zinc chloride and borax, those salts do not leach out, but react to form zinc borate, a salt which is highly efficacious for fireproofing and which is insoluble in water.

My composition, suitably modified if desired, has a multitude of other uses, as it can be widely employed as a substitute for the plasticizer ordinarily used in lacquers, varnishes, paint saturants, surface coatings, plastic masses or other products made with plasticizers. I believe my invention constitutes an important contribution to the manufacture of a host of articles such as airplane members, artificial leather, wire insulation, washable window shades, paints and lacquers, molding compositions, laminated paper and fabrics, natural and synthetic fibers, tents, awnings, tarpaulins, etc. made with plasticizers and in which fireproofness is desired. Where my composition is substituted for an ordinary plasticizer in the molten compounding of thermoplastic materials, or in the molten application of a film forming compound to textiles or other bases, it affords fireproofing salts in solution without the need for the use of a volatile solvent.

The composition made from the above speific formula imparts fireproofness with the desired degree of plasticity for many uses. Thus, in the above example of canvas treatment the chlorinated rubber, employed as a binder for the impregnant, is non-burning, but I am able to effect fireproofing even though a slow burning binder, such as a co-polymer of vinyl acetate and vinyl chloride were used, or even in the very extreme case where a highly inflammable binder, such as comprising nitrocellulose were used.

For some purposes I may vary the specific formula of my composition above described in the amounts or kinds of salts, solvents or plasticizers employed and many useful variations will be apparent once the principle of my invention is understood. Thus if weather-resistant fireproofing is not required, the composition could be made with a single water soluble fireproofing salt, in which event I should omit from the above formula preferably the borax and the diethylene glycol monoethyl ether, retaining the zinc chloride, ethylene glycol monoethyl ether and tricresyl phosphate, preferably increasing the amount of zinc chloride to obtain the fireproofness of the above example.

Even where a plurality of reactive salts are to be used for weather resistance, there is considerable choice. In selecting the salts I prefer to use two or more having the following characteristics:

A. At least one and preferably each salt should be a fireproofing salt as above defined.
B. In the presence of water they should undergo double decomposition to form at least one water insoluble fireproofing salt.

Thus all of the water soluble salts of aluminum, antimony, lead, magnesium, manganese, tin and zinc, all of whose water soluble chlorides, at least, are fireproofing salts, react with all the water soluble borates, carbonates, fluorides, phosphates, silicates and tungstates, each of which is a fireproofing salt, to form one or more water insoluble fireproofing salts.

Of the water soluble salts of the above mentioned metals, I prefer their chlorides because they are fireproofing, but I may also use their acetates, nitrates and bromides as well as others, although the bromides are comparatively expensive and in the case of the nitrates it would be necessary to complete the reaction at once and wash out of the goods the soluble products of the double decomposition. All of the above mentioned water soluble chlorides, acetates, nitrates and bromides, as well as all of the borates and carbonates of sodium, potassium and ammonium, the phosphates of sodium and ammonium, and the acid phosphate of potassium, are soluble in one or more available solvents including ether alcohols (such as ethylene glycol monoethyl ether, diethylene glycol monoethyl ether, ethylene glycol monobutyl ether, diethylene glycol monobutyl ether) esters (such as butyl acetate, butyl lactate, ethyl lactate) ketones (such as methyl hexyl ketone, methyl-n-amyl ketone), amines (such as triethanolamine) and alcohols (such as caprillic alcohol, ethyl alcohols, cyclohexanol).

Zinc chloride will dissolve in any of the above solvents and diethylene glycol monoethyl ether will dissolve any of the above salts. Ethyl lactate will dissolve most, if not all, of them.

There is a wide field of plasticizers available of the substantially water insoluble type above noted, comprising, as is well known, organic compounds having a high boiling point and low vapor pressure, such as the organic phosphates, phthalates, glycollates, carbamates, citrates, adipates and abietates as well as many miscellaneous esters and ethers. Plasticizers of low or noninflammability such as tricresyl phosphate, tri-(2 chlorethyl) phosphate, phenyl di-ortho diphenyl phosphate, etc. are naturally better for my purpose where they are otherwise usable, but even those that are inflammable, such as dimethoxy ethyl phthalate, diethoxy ethyl phthalate, triethylene glycol di-2 ethyl butyrate, butyl phthalyl butyl glycollate, di-butyl tartrate, or mixtures of these with the noninflammable plasticizers can be used to meet special requirements.

The choice of salts, solvents and plasticizers is governed by the fireproofing and plasticity required and by the fact that the solvents used, whether one or more, should dissolve all of the salts and plasticizers employed to make either a single solution or a plurality of solutions that are compatible with each other and, when evaporated off, will leave the salts in solution in the plasticizer.

Without attempting to give all of the combinations that are available, the following formulae indicate how the salts, solvents and plasticizers may each be varied in the preferred formula disclosed above:

1. Varying the salts while retaining the plasticizer and one or both of the solvents:

| | Parts |
|---|---|
| a. Stannous chloride | 6 |
| Ammonium borate | 4½ |
| Ethylene glycol monoethyl ether | 44 |
| Diethylene glycol monoethyl ether | 46 |
| Tricresyl phosphate | 100 |

| | Parts |
|---|---|
| b. Zinc chloride | 22 |
| Potassium carbonate | 6 |
| Ethylene glycol monoethyl ether | 59 |
| Diethylene glycol monoethyl ether | 88 |
| Tricresyl phosphate | 120 |

| | Parts |
|---|---|
| c. Zinc chloride | 22 |
| Borax | 5 |
| Potassium carbonate | 2 |
| Ethylene glycol monoethyl ether | 59 |
| Diethylene glycol monoethyl ether | 88 |
| Tricresyl phosphate | 120 |

2. Varying the plasticizer while retaining the salts and solvents:

| | Parts |
|---|---|
| Zinc chloride | 22 |
| Borax | 10 |
| Ethylene glycol monoethyl ether | 59 |
| Diethylene glycol monoethyl ether | 29 |
| Dibutyl tartrate | 180 |

3. Varying the solvents while retaining the salts and plasticizer:

| | Parts |
|---|---|
| Ethyl lactate | 128 |
| Zinc chloride | 22 |
| Borax | 10 |
| Tricresyl phosphate | 120 |

4. Further variations:

| | Parts |
|---|---|
| a. Magnesium chloride | 24 |
| Ammonium borate | 9 |
| Ethylene glycol monoethyl ether | 100 |
| Diethylene glycol monoethyl ether | 100 |
| Dibutyl tartrate | 200 |

| | Parts |
|---|---|
| b. Stannous chloride | 6 |
| Ammonium borate | 4½ |
| Ethylene glycol monoethyl ether | 44 |
| Diethylene glycol monoethyl ether | 46 |
| Diethoxy ethyl phthalate | 100 |

| | Parts |
|---|---|
| c. Zinc chloride | 9 |
| Ammonium borate | 3 |
| Ethyl lactate | 24 |
| Diethylene glycol monoethyl ether | 30 |
| Triethylene glycol di-2-ethyl butyrate | 33 |
| Tricresyl phosphate | 33 |

| | Parts |
|---|---|
| d. Zinc chloride | 9 |
| Ammonium borate | 3 |
| Ethyl lactate | 43 |
| Diethylene glycol monoethyl ether | 30 |
| Dimethoxy ethyl phthalate | 66 |

| | Parts |
|---|---|
| e. Lead acetate | 15 |
| Ammonium borate | 9 |
| Diethylene glycol monoethyl ether | 200 |
| Dibutyl tartrate | 200 |

My invention is not to be limited to any of the specific details above recited except as required by the appended claims.

I claim:

1. A liquid composition adapted to be added to a material for imparting fire resistance and plasticity thereto comprising at least one fireproofing salt in solution in a liquid consisting substantially entirely of a substantially water-insoluble plasticizer.

2. A liquid composition adapted to be added to a material for imparting fire resistance and plasticity thereto comprising at least one fireproofing salt in solution in a liquid consisting substantially entirely of tricresyl phosphate.

3. A liquid composition adapted to be added to a material for imparting fire resistance and plasticity thereto comprising a plurality of water-soluble salts, at least one of which is a fireproofing salt, capable of reacting together in the presence of water to form a water-insoluble fireproofing salt, said water-soluble salts being in solution in a liquid consisting substantially entirely of a substantially water-insoluble plasticizer.

4. A liquid composition adapted to be added to a material for imparting fire resistance and plasticity thereto comprising a plurality of water-soluble fireproofing salts capable of reacting together in the presence of water to form a water-insoluble fireproofing salt, said water-soluble salts being in solution in a liquid consisting substantially entirely of a substantially water-insoluble plasticizer.

5. A liquid composition adapted to be added to a material for imparting fire resistance and plasticity thereto comprising a plurality of water-soluble inorganic fireproofing salts capable of double decomposition in the presence of water to form a water-insoluble fireproofing precipitate, each of said salts being in solution in a liquid consisting substantially entirely of a substantially water-insoluble plasticizer.

6. A liquid composition adapted to be added to a material for imparting fire resistance and plasticity thereto comprising a salt chosen from the group consisting of water-soluble salts of aluminum, antimony, lead, magnesium, manganese, tin and zinc in solution with a salt chosen from the group consisting of water-soluble borates, carbonates, fluorides, phosphates, silicates and tungstates in a liquid consisting substantially entirely of a substantially water-insoluble plasticizer.

7. The liquid composition as defined in claim 6 in which all of the salts of the first-mentioned group are chlorides.

8. A liquid composition adapted to be added to a material for imparting fire resistance and plasticity thereto comprising a water-soluble zinc salt and a water-soluble borate in solution in a liquid consisting substantially entirely of tricresyl phosphate.

9. A liquid composition adapted to be added to a material for imparting fire resistance and plasticity thereto comprising zinc chloride and borax in solution in a liquid consisting substantially entirely of tricresyl phosphate.

10. A liquid composition adapted to be added to a material for imparting fire resistance and plasticity thereto comprising a plurality of water-soluble fireproofing salts, one of which is a water-soluble borate, adapted to react together in the presence of water to form a water-insoluble fireproofing borate, said water-soluble salts being in solution in a liquid consisting substantially entirely of a substantially water-insoluble plasticizer.

11. A liquid composition adapted to be added to a material for imparting fire resistance and plasticity thereto comprising a plurality of water-soluble salts capable of reacting together in the presence of water to form a water-insoluble fireproofing salt, said water-soluble salts being in solution in a liquid consisting substantially entirely of a plasticizer chosen from the group consisting of tricresyl phosphate, dimethoxy ethyl phthalate, diethoxy ethyl phthalate, trithylene glycol di-2 ethyl butyrate and dibutyl tartrate.

12. The method of making a liquid composition which consists in preparing a solution, in organic solvent, of a substantially water-insoluble plasticizer and a plurality of water-soluble salts, at least one of which is a fireproofing salt, said salts being adapted to react together in the presence of water to form a fireproofing precipitate, and forming from the solution thus made a liquid adapted to be added to a material for imparting fire resistance and plasticity thereto by removing said solvent to leave the salts in solution in the plasticizer.

13. The method of making a liquid composition which consists in preparing a solution, in organic solvent, of a substantially water-insoluble plasticizer and a plurality of water-soluble salts, at least one of which is a fireproofing salt, adapted to react together in the presence of water to form a water-insoluble fireproofing salt, and forming from the solution thus made a liquid adapted to be added to a material for imparting fire resistance and plasticity thereto by removing said solvent to leave the salts in solution in the plasticizer.

HARRY HOPKINSON.